United States Patent [19]
Tremblay et al.

[11] Patent Number: 6,105,352
[45] Date of Patent: Aug. 22, 2000

[54] HARVESTER FOR PICKING BERRIES

[75] Inventors: Benoît Tremblay; Serge Bouchard, both of Normandin, Canada

[73] Assignee: Benoit Tremblay Soudure Inc., Canada

[21] Appl. No.: 09/122,138

[22] Filed: Jul. 24, 1998

[51] Int. Cl.[7] .................................................. A01D 46/00
[52] U.S. Cl. ........................................ 56/330; 56/327.1
[58] Field of Search .................. 56/330, 328.1, 56/327.1

[56]  References Cited

U.S. PATENT DOCUMENTS

| | | | |
|---|---|---|---|
| 425,695 | 4/1890 | Pontious | 56/330 |
| 1,533,644 | 4/1925 | Gebhardt | 56/330 |
| 2,504,459 | 4/1950 | Schneider et al. | 56/330 |
| 2,696,706 | 12/1954 | Getsinger | 56/330 |
| 2,795,099 | 6/1957 | Getsinger | 56/330 |
| 3,596,456 | 8/1971 | Quick | 56/330 |
| 3,648,447 | 3/1972 | Burton | 56/330 |
| 4,519,191 | 5/1985 | Ledebuhr et al. | 56/330 |
| 4,914,774 | 4/1990 | Sheehan et al. | 56/328.1 |
| 5,375,402 | 12/1994 | Gidge | 56/330 |
| 5,465,562 | 11/1995 | Croft | 56/328.1 |

*Primary Examiner*—Thomas B. Will
*Assistant Examiner*—Meredith C. Petravick
*Attorney, Agent, or Firm*—St. Onge Steward Johnston & Reens LLC

[57] ABSTRACT

The harvester for picking up berries comprises a frame adapted to be driven in a field of berries, a comb mounted between opposite sides of the frame and comprising a plurality of teeth extending substantially in a horizontal position to seize branches of berries as the frame is driven in the field. The harvester is provided with a sweeping system mounted on the frame above the comb for sweeping the berries of the branches seized by the comb. The sweeping system preferably comprises a brush parallel to the comb and comprising a rotatable shaft operatively mounted between the opposite sides of the frame and a plurality of bristles circumferencially distributed around the shaft.

9 Claims, 3 Drawing Sheets

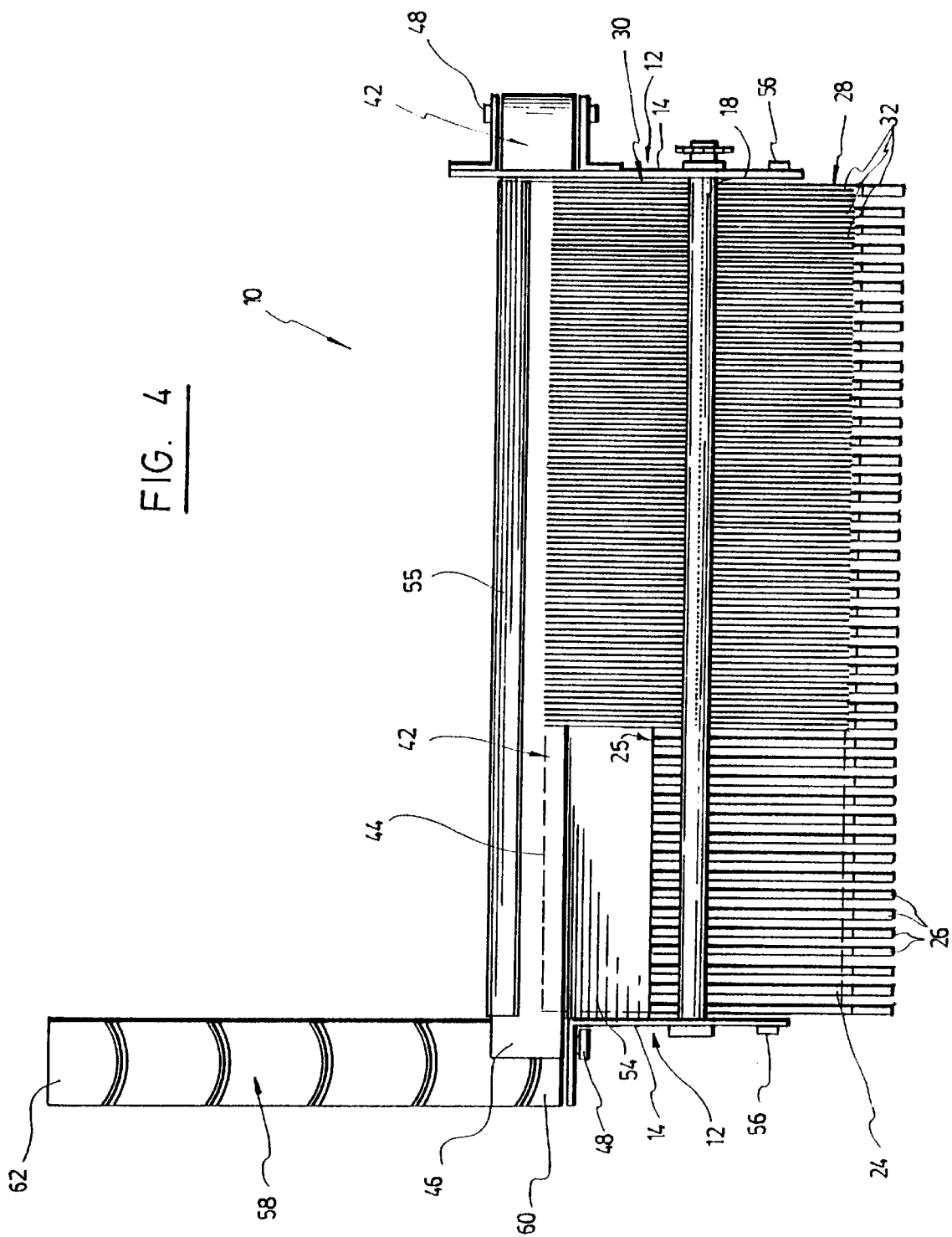

HARVESTER FOR PICKING BERRIES

FIELD OF THE INVENTION

The present invention relates to the art of harvesting and more particularly to a harvester for picking berries and the method thereof.

BACKGROUND OF THE INVENTION

Harvesting of berries such as blueberries, strawberries and raspberries requires great care in order to avoid damaging the fruits. On the other side, in order to be profitable, the method or apparatus used for harvesting berries should provide a maximum amount of berries in the shortest time.

Already known in the art of berry harvesting, more particularly of blueberry harvesting, there is the apparatus that resembles a wheelbarrow in that it consists of a two-wheeled vehicle with handles at the rear and a tiltable shallow container at the front, the container being movable between an upward and a downward position, as a seesaw. In the front, the container has the shape of a comb, for seizing branches of blueberries when the apparatus is moved in a field of blueberries with the container in the downward position. When the comb is full of branches, the container is moved in the upward position thereby taking off the blueberries which then fall within the container. As can be easily understood, the harvesting capacity of such a prior art apparatus which has to be pushed by the user is very small indeed.

There is thus presently a need for a profitable, simple and affordable berry harvester.

SUMMARY OF THE INVENTION

An object of the present invention is to provide a harvester for picking berries that satisfies the above-mentioned need.

In accordance with that object, the present invention proposes a harvester for picking up berries in a field, the harvester comprising:
- a frame adapted to be driven in the field, and being defined by two opposite side framing members and a back framing member;
- a comb mounted between the opposite side framing members of the frame and comprising a plurality of teeth extending forwardly in a generally horizontal position to seize branches of berries as the frame is driven in the field, each of the teeth having a front end and a back end defining respectively an input end and an output end of the comb and whereby the branches of berries are received at the input end of the comb;
- a brush comprising:
  - a rotatable shaft operatively mounted between the opposite side framing members of the frame; and
  - a plurality of bristles circumferentially distributed around the shaft for sweeping the berries of the branches seized by the comb toward the output end of the comb as the frame is driven in the field and the shaft is actuated into rotation;
- a conveyor extending transversally between the output end of the comb and the back framing member of the frame to receive the berries swept by the brush;
- a generally vertically extending stopping plate mounted behind the conveyor for stopping the berries swept by the brush; and
- an actuator for actuating the rotatable shaft of the brush.

The present invention also proposes a method for harvesting berries comprising the steps of:

a) driving a frame in a field of berries, the frame being defined by two opposite side framing members and a back framing member;

b) seizing branches of berries with a comb mounted between the opposite side framing member and comprising a plurality of teeth extending forwardly in a generally horizontal position, each of the teeth having a front end and a back end defining respectively an input end and an output end of the comb and whereby the branches of berries are received at the input end of the comb;

c) sweeping the berries of the branches seized by the comb towards the output end of the comb with a rotatable brush with bristles operatively mounted between the side framing members above the comb;

d) receiving the berries swept on a conveyor extending transversally between the output end of the comb and the back framing member of the frame; and e) stopping the berries swept by the brush with a generally vertically extending stopping plate mounted behind the conveyor.

As can be appreciated, a berry harvester according to the present invention makes the berry harvesting very easy and efficient as it allows a substantial amount of berries to be picked up very rapidly. It is also very simple to use and is affordable.

A non restrictive description of a preferred embodiment of the invention will now be given with reference to the appended drawings.

BRIEF DESCRIPTION OF THE DRAWINGS

FIG. 4 is a cross-sectional top view along line IV—IV of FIG. 1.

DESCRIPTION OF A PREFERRED EMBODIMENT

Figure 1:
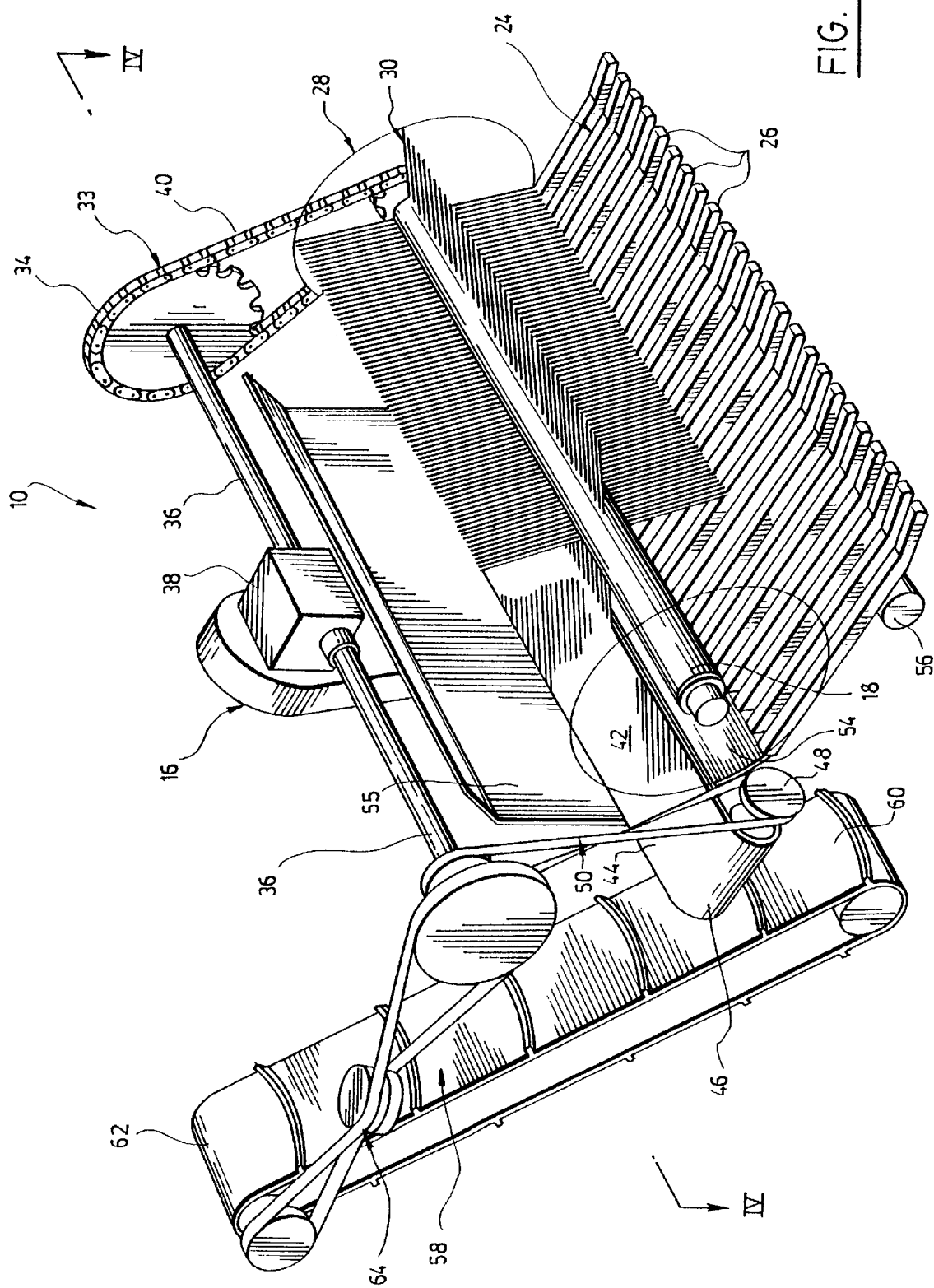
FIG. 1 is a perspective view of a preferred embodiment of a harvester according to the present invention, shown without the frame.
Figure 2:
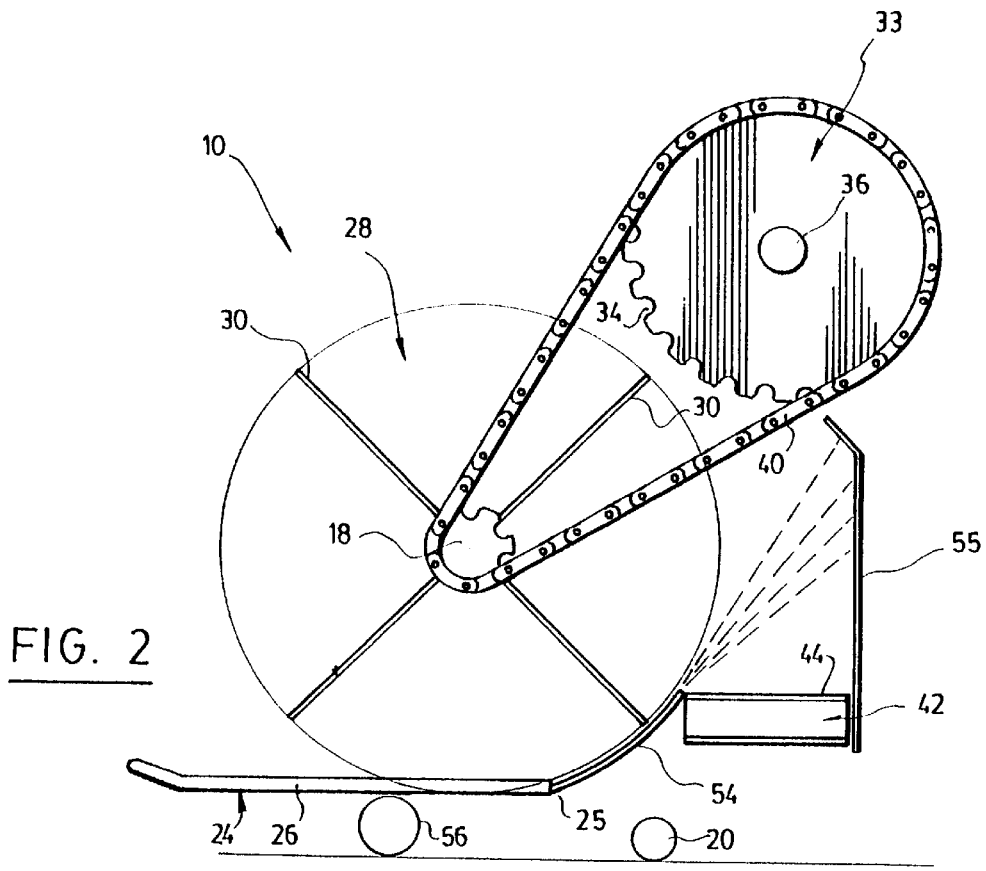
FIG. 2 is a side elevational view of the harvester of FIG. 1.
Figure 3:
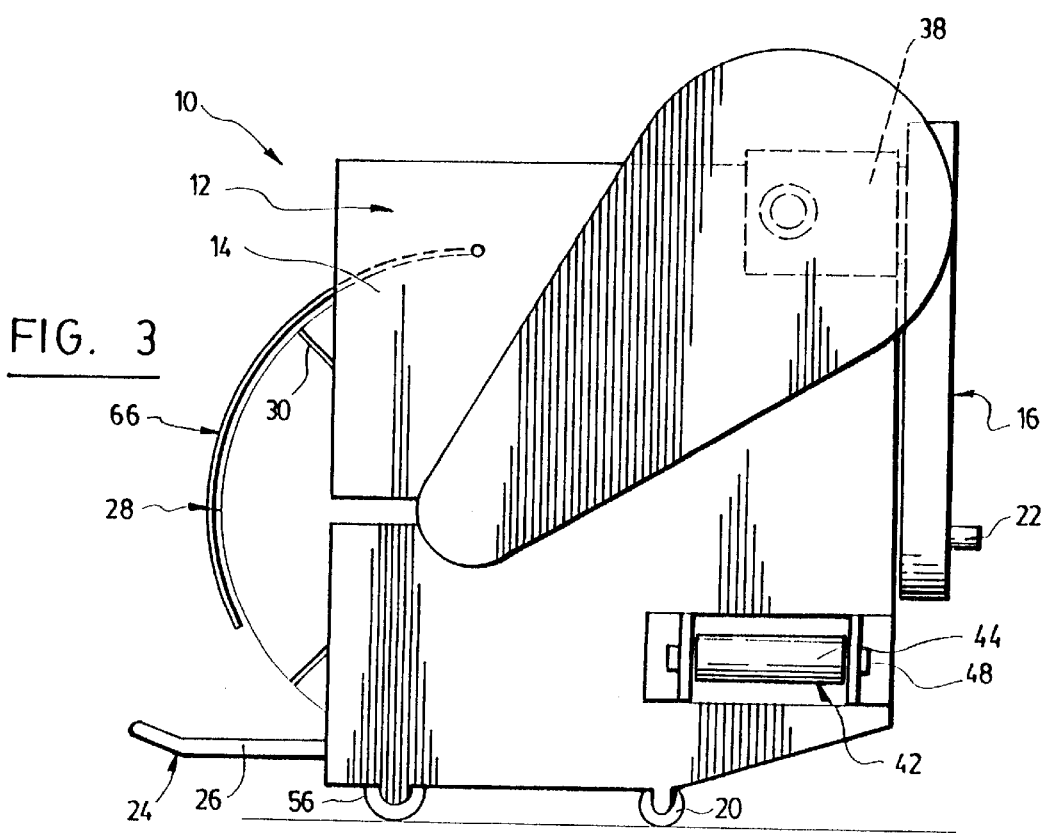
FIG. 3 is the same view as FIG. 2, shown with the side frame.

Referring to FIGS. 1 to 4, a harvester (10) for picking up berries according to a preferred embodiment of the present invention is illustrated. The harvester (10) comprises a frame (12) shown in FIGS. 3 and 4 adapted to be driven in the field. The frame (12) comprises two opposite sides (14) which preferably consist of two side walls, a back framing member (16) and a rotatable front shaft (18), each connecting the side walls (14). The frame (12) is mounted on wheels (20), as shown in FIG. 3, or any other means allowing the frame to be moved. A coupler head (22) for coupling the harvester (10) to any powered vehicle such as a tractor is mounted on the back framing member (16). A chain drive mechanism is enclosed in the back framing member (16) to transmit power from the vehicle to the coupler head (22), then to the harvester. In another preferred embodiment (not illustrated), the frame may simply comprise handles or any other means known in the art to allow the harvester to be driven in the field.

A comb (24) is mounted between the opposite sides (14) of the frame (12) below the front shaft (18). The comb (24) comprises a plurality of teeth (26) extending substantially in a horizontal position to seize branches of berries as the frame

(12) is driven in the field. The comb (24) is preferably mounted near the bottom edge of the side walls(14) in order to grasp a maximum of branches and therefore to harvest a maximum of berries.

Sweeping means generally indicated as reference numeral (28) in FIGS. 1 to 4 are mounted on the frame (12) above the comb (24) for sweeping the berries of the branches seized by the comb (24). Preferably as illustrated, the sweeping means (28) comprise a brush (30) parallel to the comb (24) and comprising the rotatable front shaft (18) or another shaft operatively mounted between the opposite sides (14) of the frame (12). The brush (30) also comprises a plurality of bristles (32) circumferencially distributed around the rotatable shaft (18). Only a portion of those bristles is shown in FIGS. 1 and 4. As can be appreciated, as the frame (12) is driven in the field and the rotatable shaft (18) is actuated into rotation, the bristles (32) sweep the berries of the branches seized by the comb (24) towards an output end (25) thereof, as best illustrated in FIG. 2. A conventional chain drive mechanism (33) is provided to drive the front shaft (18) into rotation. More particularly, the chain drive mechanism (33) of this preferred embodiment comprises a driving wheel (34) mounted on one of the side walls (14) of the frame (12). The driving wheel (34) is operatively connected to a driving shaft (36) powered by a power source (38), which is operatively coupled to the coupler head (22) by means of another chain drive mechanism described hereinbefore and enclosed in the back framing member (16). The driving wheel (34) is also operatively connected to an end of the front shaft (18) by means of a driving belt (40).

The harvester (10) is further provided with means for receiving the berries swept by the brush (30). Preferably, the receiving means comprises a conveyor (42) mounted between the opposite sides (14) of the frame (12). As illustrated, the conveyor (42) comprises an endless conveyor belt (44) parallel to the comb (24) to receive the berries and to convey the berries towards an output (46) of the conveyor (42). The conveyor belt (44) is operatively mounted on two driving shafts (48) each mounted on the frame (12). A chain drive mechanism (50) well known in the art, and that does not need further description, actuates the conveyor belt(44). The conveyor belt (44) may be positioned directly at the output end (25) of the comb (24) or, as illustrated in FIGS. 2 and 4, for the ease of construction, slightly remote from and above that output end (25). In this latter case, a guiding ramp (54) is provided to guide the berries from the output end (25) of the comb (24) onto the conveyor belt (44) and a stopping plate (55) is mounted behind the conveyor (42) for stopping the berries, flying towards the back end of the harvester due to the effect of guiding ramp (54).

Preferably as illustrated, the harvester (10) further comprises means for preventing the branches seized by the teeth (26) from jamming therebetween. This means may comprise a rolling bar (56) mounted between the opposite sides (14) of the frame (12) under and adjacent to the comb (24). The rolling bar (56) is in contact with the ground of the field so that it is driven into rotation when the frame (12) is driven in the field, thereby preventing the seized branches from penetrating too far towards the root or foot of the teeth and get jamming therein.

A harvester according to the present invention may comprise an angled conveyor (58) mounted on a side of the frame or directly on a tractor propelling the harvester. This angled conveyor (58) may have an input end (60) for receiving the berries coming from the first conveyor (42) and an output end (62) located at a given distance from the user allowing the same to manipulate the berries. Advantageously, a removable harvesting container that can be easily manipulated by the user may be provided at the output end (62) of the angled conveyor (58).

The bristles (32) of the brush (30) are preferably made of nylon or any other material known in the art suitable for bristles. As illustrated in FIG. 3, a protecting cover (60) may be mounted in front of the brush (30).

The harvester (10) described above is adapted to be pushed in a field of berries as the coupler head (22) is located at the back of the harvester (10). However, it should be noted that in another preferred embodiment according to the present invention, the coupler head may have been located at the front end of the harvester for towing the same in the field.

The berries that may be harvested are preferably blueberries, strawberries, raspberries or any other small fruits growing in a field.

The method for harvesting berries with a harvester as described hereinabove comprises the steps of:
a) driving the frame (12) in a field of berries;
b) seizing branches of berries with the comb (24) mounted between the opposite sides (14) of the frame (12) and comprising a plurality of teeth (26) extending substantially in a horizontal position;
c) actuating into rotation the rotatable brush (30) mounted on the frame (12) above the comb;
d) sweeping the berries of the branches seized by the comb with the brush; and
e) receiving the berries swept by the brush.

Preferably, the method further comprises the additional step of preventing the branches seized by the teeth from jamming therebetween.

A berry harvester according to the present invention makes the berry harvesting very easy and efficient as it allows a large amount of berries to be picked up very rapidly. It is also very simple to use and is affordable.

Although a preferred embodiment of the invention has been described in detail herein and illustrated in the accompanying drawings, it is to be understood that the invention is not limited to this precise embodiment and that various changes and modifications may be effected therein without departing from the scope of the present invention.

What is claimed is:

1. A harvester for picking up berries in a field, the harvester comprising:
   a frame adapted to be driven in the field, and being defined by two opposite side framing members and a back framing member;
   a comb mounted between the opposite side framing members of the frame and comprising a plurality of teeth extending forwardly in a generally horizontal position to seize branches of berries as the frame is driven in the field, each of the teeth having a front end and a back end defining respectively an input end and an output end of the comb and whereby the branches of berries are received at the input end of the comb;
   a brush comprising:
      a rotatable shaft operatively mounted between the opposite side framing members of the frame; and
      a plurality of bristles circumferentially distributed around the shaft for sweeping the berries of the branches seized by the comb toward the output end of the comb as the frame is driven in the field and the shaft is actuated into rotation;
   a conveyor extending transversally between the output end of the comb and the back framing member of the frame to receive the berries swept by the brush;

a generally vertically extending stopping plate mounted behind the conveyor for stopping the berries swept by the brush; and an actuator for actuating the rotatable shaft of the brush.

2. The harvester of claim 1, wherein the teeth of the comb extend forwardly beyond the bristles of the brush.

3. The harvester of claim 1 further comprising a guiding ramp between the output end of the comb and the conveyor for guiding the berries from the output end of the comb onto the conveyor.

4. The harvester of claim 1 further comprising a stop for preventing the branches seized by the teeth from jamming therebetween.

5. The harvester of claim 4 wherein the stop for preventing the branches from jamming comprises a rolling bar mounted between the opposite side framing members of the frame under and adjacent to the comb near the output end thereof, the rolling bar being in contact with the ground of the field so that it is driven into rotation when the frame is driven in the field.

6. The harvester of claim 1 wherein the conveyor comprises a drive mechanism operatively connected to the actuator to drive the conveyor.

7. The harvester of claim 6, wherein the drive mechanism comprises a chain drive mechanism operatively connected to and end of the shaft of the brush.

8. A method for harvesting berries comprising the steps of:

a) driving a frame in a field of berries, the frame being defined by two opposite side framing members and a back framing member;

b) seizing branches of berries with a comb mounted between the opposite side framing members and comprising a plurality of teeth extending forwardly in a generally horizontal position, each of the teeth having a front end and a back end defining respectively an input end and an output end of the comb and whereby the branches of berries are received at the input end of the comb;

c) sweeping the berries of the branches seized by the comb towards the output end of the comb with a rotatable brush with bristles operatively mounted between the side framing members above the comb;

d) receiving the berries swept on a conveyor extending transversally between the output end of the comb and the back framing member of the frame; and e) stopping the berries swept by the brush with a generally vertically extending stopping plate mounted behind the conveyor.

9. A method as claimed in claim 8, comprising the additional step of preventing the branches seized by the teeth from jamming therebetween.

* * * * *